July 19, 1960
A. A. MILLER
2,945,792
POLYOLEFINS
Filed May 20, 1957
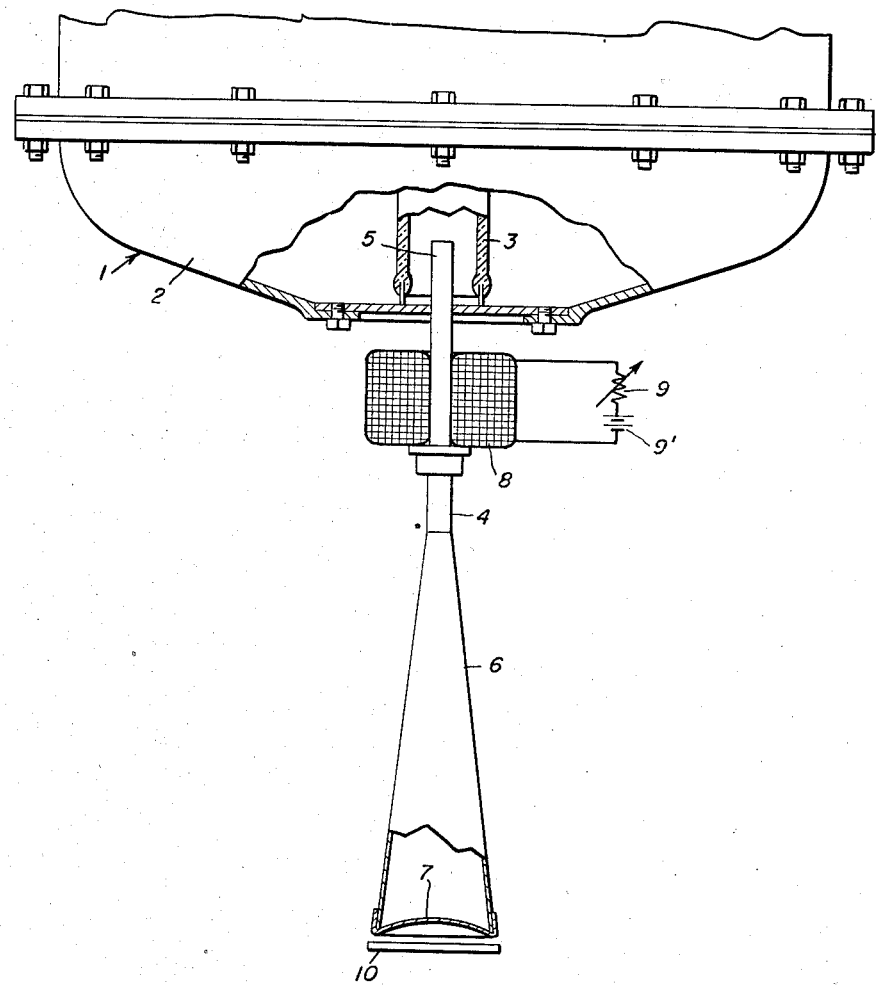
Inventor:
Alexander A. Miller,
by Paul A. Frank
His Attorney.

United States Patent Office 2,945,792
Patented July 19, 1960

2,945,792

POLYOLEFINS

Alexander A. Miller, Schenectady, N.Y., assignor to General Electric Company, a corporation of New York Filed May 20, 1957, Ser. No. 660,125

12 Claims. (Cl. 204—154)

This invention relates to a method of enhancing the cross-linking effectiveness of high energy, ionizing radiation on polyolefins. More particularly, this invention relates to a method of enhancing the cross-linking effectiveness of high energy, ionizing radiation on polyethylene and polypropylene which comprises irradiating these polymers in the presence of a chlorobenzene with ionizing radiation.

Although low molecular weight polypropylenes which are normally liquid at room temperature have long been known, recently there have been developed polypropylenes which are crystalline solids at room temperature. These unique high molecular weight polypropylenes which have been described in Belgian Patents 530,617 and 538,782, in Natta et al., JACS 77, 1708 (1955), "J. Polymer Science," XVI, 143 (1955), "Chemical Week" 78, 69–70 (Feb. 4, 1956), "Chemical and Engineering News," vol. 34, p. 2980, etc. have high melting points and have been prepared as films, fibers, etc. Where the term "polypropylene" is used hereafter in this specification, it refers to these polymers.

When one attempts to cross-link polypropylene with high energy, ionizing radiation, unsatisfactory results are usually obtained. Thus, when polypropylene is irradiated in the lower temperature ranges, such as from 25° to 90° C., little cross-linking is effected unless an extremely high dosage is employed and the irradiated polymer produced is unstable to oxygen or air. On the other hand, when polypropylene is irradiated at elevated temperature, such as above 125° C., radiation-induced degradation proceeds much faster than cross-linking with the net result that there is a sharp decrease in the cross-linked material formed.

In copending U.S. patent application, Serial No. 623,703—Lawton, filed November 21, 1956, and assigned to the same assignee as the present application, there was disclosed and claimed a method of irradiating polypropylene in which maximum cross-linking is effected by irradiating polypropylene at about 100°–125° C., but preferably at 110°–120° C. It was also disclosed and claimed that when polypropylene is irradiated at about room temperature or below 100° C. it is necessary to subsequently heat the irradiated polymer to a temperature at which it is less crystalline or substantially amorphous, preferably at 130°–200° C., to produce a stable cross-linked polymer.

Unexpectedly, I have discovered that the cross-linking effectiveness of high energy, ionizing radiation can be further enhanced beyond the temperature effect by irradiating polypropylene in the presence of a chlorobenzene, whether the irradiation is done at room temperature or at elevated temperature. This result is unexpected since other solvents retard the cross-linking effectiveness of irradiation on polypropylene.

One method of preparing the polypropylene useful in this invention has been developed by Natta, who, by using low pressures and a heterocatalyst which is essentially a combination of a metal alkyl and a metal halide of certain physical characteristic, has produced a new class of polypropylenes which are unusual in that they are isotactic or stereospecific polymers having an exceptionally regular structure, i.e., all of the monomeric units have essentially the same steric configuration of the asymmetric carbon atoms resulting in a highly crystalline product. Because the degree of crystallinity can be controlled, a broad spectrum of polypropylenes with special properties can be produced. These polymers have higher melting points than polyethylene, are more resistant to organic solvents than polyethylene, do not have polyethylene's waxy feel, etc. This type of polypropylene is sold by the Montecatini Chemical Company of Italy.

Another method of preparing polypropylene developed by Phillips Petroleum Company has been described in Belgian Patent 530,617 and other patents. This method employs as a catalyst hexavalent chrome oxide on a 10% alumina 90% silica carrier.

Still another general method has been developed by Standard Oil of Indiana using reduced metal oxides, such as reduced molybdenum oxides group VIA oxides in combination with complex metal aluminum hydrides, etc., and has been described in U.S. Patents 2,728,754, 2,731,453, 2,692,257, and other patents.

Unexpectedly, I have also discovered that the cross-linking effectiveness of high energy, ionizing radiation on polyethylene can also be enhanced by irradiating this polymer in the presence of a chlorobenzene. Although the chlorobenzenes have a more marked effect on polypropylene than on polyethylene, they also enhance the cross-linking effectiveness of ionizing radiation on polyethylene. As with polypropylene, other solvents only slightly enhance the cross-linking effect or decrease it.

All types of polyethylene are subject to this effect. One type of polyethylene is that of low density which is prepared by polymerizing ethylene at high temperatures and pressures. It is described in Patent 2,153,553—Fawcett et al., and in "Modern Plastics Encyclopedia," New York, 1949, pp. 268–271. Specific examples of commerically available low density polyethylene are the polyethylenes sold by E. I. duPont de Nemours & Co., Inc., Wilmington, Delaware, examples of which are sold under the trade name of "Alathon," its properties, uses, etc. being set forth in duPont Information Bulletin A–3584; those sold by the Bakelite Company, such as DE–2400, DYNH, etc. Other low density polyethylenes are described by Lawton et al. in "Industrial & Engineering Chemistry" 46, pp. 1703–1709 (1954).

Another type of polyethylene subject to this effect is high density polyethylene which has higher tensile strengths, higher temperature resistances, greater rigidity, etc. than low density polyethylene and have been referred to in the literature as "high density," "low pressure," "high-modulus," "high-temperature" and "high-tensile" etc. polyethylene. For convenience, in this specification the low density weight polyethylene will be called "LD" polyethylene and the high density polyethylene will be called "HD" polyethylene.

Generally, three different processes have been used to prepare HD polyethylene, differing principally from LD methods in that much lower pressures and higher catalytic activities are required. The method developed by the Phillips Petroleum Company described, for example, in Belgian Patent 530,617, and other patents, employs as a catalyst hexavalent chrome oxide on a 10% alumina 90% silica carrier. The temperature of operation is about 155° C. and only enough pressure (100–500 p.s.i.) to liquefy the diluent (pentane, octane, etc.) is required. These are sold by Phillips under the trademark of "Marlex."

The second method developed by Karl Ziegler described, for example, in British Patent 713,081, in Belgian Patent 533,362, and other patents, employs a catalyst in the form of an activated metal-organic complex having the general structure Me(R)$_n$ wherein Me is beryllium, aluminum, gallium, indium, etc. and R comprises an organic radical, for example alkyl, aryl, etc. In the Ziegler process the temperature can vary from 60–250° C. and the pressure from about 1–2000 atmospheres.

A third method of preparing high density polyethylene has been developed by Standard Oil of Indiana wherein the catalyst is a reduced metal oxide such as reduced molybdenum oxide supported on a difficulty reducible carrier such as gamma alumina, titanium, zirconium, etc. has been described in various U.S. patents, for example, in U.S. Patent 2,728,754, etc. Group VIA oxides in combination with complex metal aluminum hydrides are also described as catalysts in U.S. Patents 2,731,453, 2,692,257, etc.

The treatment of polyethylene with the solvent and the irradiation thereof can be effected in the same manner as with polypropylene. The conditions applicable to polypropylene can also be employed with polyethylene.

In general, the process is carried out by adding a sufficient amount of a chlorobenzene to polyethylene or polypropylene to convert it to a material with enhanced cross-linking ability on irradiation. Any suitable method of adding the chlorobenzene to the polymer can be employed. A convenient method of adding the chlorobenzene to the material is to place the polymer in the solvent to allow the material to become swollen with the chlorobenzene prior to irradiation. After irradiation, the chlorobenzene can be removed from the polymer by any suitable means (i.e., heat, reduced pressure, etc.).

The amount of chlorobenzene in the polymer necessary to effect cross-linking will vary within wide limits depending on the molecular weight of the polymer and the temperature at which it is irradiated. While there appears to be no upper limit to the amount of chlorobenzene which can be used, except as affects ease of operating, there is a minimum amount of chlorobenzene necessary. Although small amounts of chlorobenzene may cause some enhancement in the cross-linking ability of the polymer, at least 10%, but preferably at least 50% of chlorobenzene, based on weight of polymer, should be employed for maximum results. The desired ranges are 10 to 90%, preferably 50 to 80%. In addition, chlorobenzene may also be irradiated. Although mono- and the isomeric dichlorobenzenes are preferred, other liquid polychlorobenzenes can also be employed.

In the drawing, there is shown high voltage accelerating apparatus 1 capable of producing a beam of high energy electrons for irradiating the chlorobenzene swollen polymer in accordance with the invention. High voltage accelerating apparatus 1 may be of the type disclosed in Patent 2,144,518—Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pages 128–133 (Dec. 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing irradiated polymer according to the invention, a sheet 10 of chlorobenzene swollen polymer can be supported in the path of the electrons emerging from end-window 7 as illustrated. The high energy electrons penetrate the polymeric material to a depth dependent upon their energy and effect the above modifications in the properties of the material. Of course, sheet 10 can be in the form of strip material which is passed continuously under end-window 7 at a velocity selected to give the desired irradiation dosage. Other expedients for obtaining the irradiation of the polymer materials in various shapes (e.g., bottles, cups, tubing, filaments, pipes, etc.) will be apparent to those skilled in the art. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton or xenon, etc., to prevent the damaging effect of any corona which may be present.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "REP") is a convenient unit which usually describes the radiation dose from other than gamma or X-rays, and is the measure of the ionization in the absorber or tissue. The ionization produced by primary radiation is expressed as one REP when the energy lost in tissue is equivalent to the energy lost by the absorption of one Roentgen of gamma or X-rays in air. Further definitions of "Roentgen" and "REP" can be found on p.256 of "The Science and Engineering of Nuclear Power" edited by Clark Goodman (1947) and on p. 436 of "Nuclear Radiation Physics" by Lapp and Andrews (1948). For convenience, the term "Roentgen equivalent physical" or "REP" will be used in the specification and appended claims.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pp. 473–518 (July 1948) may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of my invention may range from about 50,000 to 20 million electron volts or higher depending upon materials. The preferable range is 100,000 to 10 million electron volts. Although high energy electron irradiation is preferred since it produces a large amount of easily controllable high energy, ionizing radiation within a short period of time without rendering the product radioactive, many other sources of high energy irradiation can be used in my invention. Examples of such radiation sources are gamma rays, such as can be obtained from $Co^{60}$, "burnt" uranium slugs, fission byproducts, such as waste solution, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, α-particles, fission fragments, such as are available from cyclotrons, etc.

The suitable radiation dose employed in carrying out this invention will of course depend upon the properties desired in the irradiated product and the particular polymer employed. For example, doses of above $1 \times 10^6$ REP, for example, from about $1 \times 10^6$ to $1 \times 10^8$ REP, but preferably 1 to $50 \times 10^6$ REP can be employed.

In order that those skilled in the art may better understand how the present invention may be practiced, the following examples are given by way of illustration and not by way of limitation. All parts are by weight. The apparatus employed was that described in the drawing with 800 KVP electrons. (KVP refers to the peak voltage in kilovolts generated by the inductance coil with high voltage apparatus 1 during the conducting half cycle and thus a measure of the energy emerging from window 7).

Solubility measurements were employed on the irradiated products to determine the percent of cross-linked polymer. Solubility measurements as a measure of percentage of cross-linking are based on the phenomenon that when polyethylene or polypropylene is subjected to irradiation, cross-links are formed. At some minimum dose, the number of cross-links is sufficient to form gel particles insoluble in such solvents for these polymers as hot toluene while at higher doses the polymer is sufficiently gelled to resist disintegration in a hot solvent but still yields on swelling some solvent extractable materials.

The effect of irradiation on solubility measurements is determined as follows: A weighed piece of irradiated polymer is immersed in a solvent for the polymer, such as about one liter of toluene, and heated for several hours or more to insure complete extraction. The test piece is then removed from the solvent and dried to constant weight under reduced pressure. Percent weight loss is equal to $$\frac{\text{(initial weight)} - \text{(final weight)}}{\text{initial weight}} \times 100$$

The percent of cross-linked polymer is equal to 100 minus the percent weight loss.

In the following examples 5 mil sheets of the polymers were immersed in the solvent until it became saturated with the solvent and the swollen saturated polymer was irradiated under the conditions indicated. The results are shown in the following tables. The untreated polymers were also irradiated as controls.

Polypropylene employed in the examples was obtained from Montecatini of Italy labelled "polipropilene ad alto cristallinata" (hereafter called "alta grade") and "polipropilene ad basa cristallinata" (hereafter called "basa grade").

*Table I*

IRRADIATION OF "BASA GRADE" POLYPROPYLENE AT 25° C.

| Ex. | Radiation Dose ($\times 10^6$ REP) | Percent Cross-linked Polymer | |
|---|---|---|---|
| | | Dry | Chlorobenzene |
| 1 | 10 | 0 | 2 |
| 2 | 20 | 0 | 32 |
| 3 | 40 | 0 | 45 |
| 4 | 50 | 0 | |
| 5 | 60 | 20 | 65 |
| 6 | 100 | 33 | |
| 7 | 150 | 48 | |
| 8 | 200 | 50 | |

From Table I it is evident that chlorobenzene markedly enhances the room temperature cross-linking effectiveness of high energy radiation on polypropylene. Chlorobenzene can effect at low doses the same amount of cross-linking that can normally be achieved only at higher doses.

*Table II*

IRRADIATION OF "ALTA GRADE" POLYPROPYLENE AT 80° C.

| Ex. | Solvent | Percent Cross-linked Polymer | Radiation Dose ($\times 10^6$ REP) |
|---|---|---|---|
| 9 | Chlorobenzene | 59 | 5 |
| 10 | O-dichlorobenzene | 37 | 5 |
| 11 | Toluene | ~0 | 5 |
| 12 | n-Octane | ~0 | 5 |
| 13 | Dry | ~0 | 20 |
| 14 | Dry | 24 | 40 |

From Table II it is evident that the chlorobenzenes enhance the elevated temperature cross-linking effectiveness of high energy radiation on polypropylene. The marked effectiveness of the chlorobenzene on the polymer as compared to other solvents or the dry polymer is shown.

*Table III*

IRRADIATION OF "ALTA GRADE" POLYPROPYLENE

| Ex. | Radiation Dose ($\times 10^6$ REP) | Percent Cross-linked Polymer | | |
|---|---|---|---|---|
| | | Dry (100° C.) | Chlorobenzene (100° C.) | p-xylene (100° C.) |
| 15 | 5 | 0 | 73 | 0 |
| 16 | 10 | 0 | | 0 |
| 17 | 20 | 24 | | 0 |

| Ex. | Radiation Dose ($\times 10^6$ REP) | Chlorobenzene (80° C.) | Chlorobenzene (25° C.) |
|---|---|---|---|
| 18 | 1 | 6 | 4 |
| 19 | 5 | 71 | 41 |
| 20 | 10 | 80 | 44 |

Table III demonstrates the enhancement effected by chlorobenzene over a wide temperature range. It also demonstrates the ineffectiveness of p-xylene in enhancing the cross-linking effectiveness of high energy radiation.

Although the chlorobenzenes have a more marked effect on polypropylene than on polyethylene, these solvents also enhance the cross-linking effectiveness of polyethylene. As in the case with polypropylene other solvents only slightly enhance the cross-linking effect or decrease it.

In the following examples polyethylene (DYNH—Bakelite Co.) was irradiated at room temperature. The results are presented in Table IV.

Table IV

EFFECT OF SOLVENT ON THE 25° C. IRRADIATION CROSS-LINKING OJ POLYETHYLENE

| Ex. | Dose (× 10⁶ REP) | Percent Cross-linked Polymer | | | | | | |
|---|---|---|---|---|---|---|---|---|
| | | Dry | Toluene | CCl₄ | Benzene | n-Octane | Chlorobenzene | O-Dichlorobenzene |
| Percent absorbed solvent in polymer | | 0 | 15 | 40 | 11 | 10 | 20 | 23 |
| 21 | 2.5 | 18 | | | | | 28 | |
| 22 | 5.0 | 34 | 5 | 15 | 28 | 43 | 50 | 60 |
| 23 | 10.0 | 53 | | | | | | |
| 24 | 20.0 | 67 | | | | | | |

It is seen from the data in Table IV that toluene, benzene and carbon tetrachloride suppress cross-linking while chlorobenzene and O-dichlorobenzene enhance it, although the latter effect is not as pronounced as in polypropylene.

In addition to effectively cross-linking polyethylene and polypropylene, the process of this invention may be applied to the filled polymers. Thus, a large variety of fillers may be used in this invention, the most desirable being those which are capable of enhancing the properties of the polymer. Examples of fillers useful in this invention are carbon blacks, silica xerogels, silica aerogels, fumed silicas, hydrophobic silicas, metal silicates such as calcium silicate, titanium dioxide, zinc oxide, metal carbonates, such as calcium carbonate, magnesium carbonate, aluminas, clays, comminuted glass, etc. As a general rule, it is desirable that the filler have a surface area of about 1 or more square meter per gram but preferably more than about 40 square meters per gram. The amount of filler advantageously present will, of course, depend on the particular filler employed and its surface characteristics, etc. may range from 1% to 60% or more based on total weight, with the preferable range being 20–40%.

The products of this invention can be used in those applications where irradiated and unirradiated polyethylene and polypropylene have heretofore been employed except that the irradiated product has the advantage of being a cross-linked polymer with accompanying improved properties, such as infusibility, enhanced insolubility, etc. Thus, irradiated polyethylene and polypropylene can be used as electrical insulating tapes, as fluid conduits or containers, as filaments or fibers, as insulating coating on wire, etc.

While the present invention has been described by reference to particular embodiments and examples thereof, variations will readily occur to those skilled in the art. It is therefore intended in the appended claims to cover all equivalents as may be in the true spirit and scope of the foregoing description, for example, various modifying agents, such as dyes, pigments, stabilizers, for example, di-α-naphthyl-p-phenylene diamine, etc. may be added to the polymer without departing from the scope of the invention. In addition, blends of polyethylene and polypropylene, containing for example from 1–99% parts by weight of polyethylene per 100 parts of both polymers, can be treated according to this invention.

What I claim as new and desire to secure by Letters Patent of the United States is:

1. A process of enhancing the cross-linking effectiveness of high energy irradiation which comprises irradiating a polymer selected from the group consisting of polyethylene and polypropylene in the presence of at least 10% of a chlorobenzene based on the weight of the polymer with ionizing radiation having energy equivalent to at least 50,000 electron volts to a radiation dose of $1 \times 10^6$ to $1 \times 10^8$ REP.

2. The process of claim 1 wherein electrons are the source of ionizing radiation.

3. The process of claim 1 where the chlorobenzene is monochlorobenzene.

4. The process of claim 1 where the chlorobenzene is dichlorobenzene.

5. The process of enhancing the cross-linking effectiveness of high energy irradiation which comprises irradiating polyethylene with ionizing radiation having energy equivalent to at least 50,000 electron volts to a dose of $1 \times 10^6$ to $1 \times 10^8$ REP in the presence of at least 10% of a chlorobenzene based on the weight of the polymer.

6. The process of claim 5 wherein electrons are the source of ionizing radiation.

7. The process of claim 5 where the chlorobenzene is monochlorobenzene.

8. The process of claim 5 where the chlorobenzene is dichlorobenzene.

9. A process of enhancing the cross-linking effectiveness of high energy irradiation which comprises irradiating polypropylene with ionizing radiation having energy equivalent to at least 50,000 electron volts to a dose of $1 \times 10^6$ to $1 \times 10^8$ REP in the presence of at least 10% of a chlorobenzene based on the weight of the polymer.

10. The process of claim 9 wherein electrons are the source of ionizing radiation.

11. The process of claim 9 where the chlorobenzene is monochlorobenzene.

12. The process of claim 9 where the chlorobenzene is dichlorobenzene.

References Cited in the file of this patent

FOREIGN PATENTS 714,843    Great Britain _____ Sept. 1, 1954

OTHER REFERENCES

Chapiro: "J. deChimie Physique," vol. 47, pages 747–763 (1950).

Bovey: "Effects of Ionizing Radiation on Natural and Synthetic High Polymers," pages 43 and 46 (1958).